United States Patent
Upson et al.

(10) Patent No.: US 8,614,160 B2
(45) Date of Patent: Dec. 24, 2013

(54) CATALYST COMPOSITIONS FOR IMPROVED FLUID CATALYTIC CRACKING (FCC) PROCESSES TARGETING PROPYLENE PRODUCTION

(75) Inventors: Lawrence L. Upson, Barrington, IL (US); Laszlo T. Nemeth, North Barrington, IL (US)

(73) Assignee: UOP LLC, Des Plaines, IL (US)

( * ) Notice: Subject to any disclaimer, the term of this patent is extended or adjusted under 35 U.S.C. 154(b) by 293 days.

(21) Appl. No.: 13/368,664

(22) Filed: Feb. 8, 2012

(65) Prior Publication Data

US 2012/0149550 A1 Jun. 14, 2012

Related U.S. Application Data

(62) Division of application No. 12/428,892, filed on Apr. 23, 2009, now Pat. No. 8,137,534.

(51) Int. Cl.
   *B01J 29/06* (2006.01)
(52) U.S. Cl.
   USPC .................. 502/67; 502/63; 502/64; 502/69; 502/71; 502/77; 502/79
(58) Field of Classification Search
   USPC .......................... 502/63, 64, 67, 69, 71, 77, 79
   See application file for complete search history.

(56) References Cited

U.S. PATENT DOCUMENTS

| | | | | |
|---|---|---|---|---|
| 3,686,121 A | * | 8/1972 | Kimberlin et al. | 502/66 |
| 3,748,251 A | * | 7/1973 | Tompkins et al. | 208/74 |
| 3,847,793 A | * | 11/1974 | Schwartz et al. | 208/70 |
| 4,340,465 A | * | 7/1982 | Miller et al. | 208/120.15 |
| 5,318,692 A | * | 6/1994 | Eberly et al. | 208/120.1 |
| 7,374,662 B2 | * | 5/2008 | Duplan et al. | 208/113 |
| 2008/0293561 A1 | * | 11/2008 | Long et al. | 502/65 |
| 2009/0082193 A1 | * | 3/2009 | Wachter | 502/68 |

OTHER PUBLICATIONS

Wang et al., "Study of cracking FCC naphtha in a secondary riser of the FCC unit for maximum propylene production", Fuel Processing Technology, 89, 2008, pp. 864-873.*

Corma et al., "Different process schemes for converting light straight run and fluid catalytic cracking naphthas in a FCC unit for maximum propylene production", Applied Catalysis A:General, 265, 2004, pp. 195-206.*

* cited by examiner

*Primary Examiner* — Elizabeth Wood
(74) *Attorney, Agent, or Firm* — James C Paschall

(57) ABSTRACT

Catalyst compositions comprising a siliceous zeolite component, either in separately formed catalyst particles or dispersed in the same binder or matrix as other zeolites of the compositions, are described. The catalyst compositions, for example as blends of three different bound zeolite catalysts, are particularly useful in fluid catalytic cracking (FCC) processes due to the reductions in coke and dry gas yields that allow FCC throughput, which is normally constrained by gas handling and/or catalyst regeneration capacity, to be increased.

2 Claims, No Drawings

CATALYST COMPOSITIONS FOR IMPROVED FLUID CATALYTIC CRACKING (FCC) PROCESSES TARGETING PROPYLENE PRODUCTION

CROSS-REFERENCE TO RELATED APPLICATION

This application is a Division of application Ser. No. 12/428,892 filed Apr. 23, 2009, now U.S. Pat. No. 8,137,534, the contents of which are hereby incorporated by reference in its entirety.

FIELD OF THE INVENTION

The invention relates to processes for fluid catalytic cracking (FCC) processes used to produce propylene and other hydrocarbon products, as well as catalyst systems for use in these processes that decrease yields of undesirable byproducts including dry gas (hydrogen, methane, ethane, and ethylene) and coke. Representative catalyst compositions comprise a highly siliceous zeolite such as silicalite.

DESCRIPTION OF RELATED ART

Fluid catalytic cracking (FCC) processes are known for the conversion relatively high boiling or heavy hydrocarbon fractions, such as crude oil atmospheric and vacuum column residues and gas oils, to produce more valuable, lighter hydrocarbons and particularly those in the gasoline boiling range. The high boiling feedstock is contacted in one or more reaction zones with a particulate cracking catalyst that is maintained in a fluidized state, under conditions suitable for carrying out the desired cracking reactions. In the fluidized contacting or reaction zone, carbonaceous and other fouling materials are deposited on the solid catalyst as coke, which reduces catalyst activity. The catalyst is therefore normally conveyed continuously to another section, namely a rejuvenation or regeneration zone, where the coke is removed by combustion with an oxygen-containing regeneration gas. The resulting regenerated catalyst is, in turn, continuously withdrawn and reintroduced in whole or in part to the reaction zone.

The absence of hydrogen in FCC provides a cracked product slate with a significant quantity of aromatic and other unsaturated compounds that are favorably blended into gasoline due to their high octane values. These gasoline boiling range hydrocarbons are normally removed as a vapor fraction from an FCC main column that fractionates the FCC reactor effluent after exiting the reaction zone. FCC is well known and described, for example, in U.S. Pat. No. 4,003,822 and elsewhere. Since the time of that publication, many advances in FCC technology have allowed refiners to increase the feed processed in a given size unit. These advances have included changes to reactor and regenerator internals as well as new catalyst developments and the use of additives to increase FCC processing capability. Limits on the extent to which capacity can be increased may, in some cases, be dictated by the size of product separation facilities of the FCC unit, which can create a bottleneck. An important consideration in this regard is the gas concentration section and particularly its main source of energy, namely the wet gas compressor.

Recently, the operation of many FCC processes has focused on raising yields of light olefins and propylene in particular by increasing the extent of cracking or conversion. Propylene is an important raw material in many petrochemicals, and its production from sources other than FCC, and particularly as a byproduct of steam cracking, is not expected to meet the increasing demand. Improving propylene yield by even a small percentage using FCC can therefore have a significant economic effect. Unfortunately, however, modifications in FCC processes to target propylene yield are often accompanied by higher yields of both dry gas and catalyst coke, leading to bottlenecks that limit the capacity, and consequently the profitability, of the overall process. For example, increased yields of hydrogen and $C_1$-$C_2$ hydrocarbons result in limits on the FCC throughput, due to total gas handling constraints of a given unit, and particularly the wet gas compressor capacity. Likewise, increased spent FCC catalyst coke levels restrict the throughput of the process to limits on the catalyst regenerator air blower capacity and/or maximum regenerator temperature.

There is an ongoing need for improved FCC processes and catalyst systems for propylene production, and particularly those that do not appreciably reduce processing capacity relative to conventional, lower severity FCC processes designed to target the production of gasoline boiling range hydrocarbons.

SUMMARY OF THE INVENTION

Aspects of the invention are associated with fluid catalytic cracking (FCC) processes, and particularly those used for the production of propylene, in which yields of dry gas (hydrogen, methane, ethane, and ethylene) and coke are reduced. In particular, it has now been discovered that the use of a siliceous zeolite having a very high silica to alumina molar framework ratio (e.g., at least about 100) in combination with other zeolites in a catalyst composition is beneficial in this regard. Without being bound by theory, it is believed that observed reductions in coke and dry gas yields associated with such a siliceous zeolite, together with an increase in gasoline yield, result from the suppression of free radical formation that leads to non-selective cracked products. In comparison, while the presence of high $SiO_2$:$Al_2O_3$ framework molar ratio ZSM-5 zeolite (e.g., in the range from 30-60), in FCC catalyst compositions can retard free radical cracking, the overall catalytic cracking activity of the ZSM-5 zeolite nevertheless results in a net increase in dry gas in FCC processes targeting propylene production. This increases the overall gas loading on the gas handling section and particularly the wet gas compressor, to the detriment of the overall capacity of the FCC unit.

The use of a very high $SiO_2$:$Al_2O_3$ framework molar ratio zeolite such as silicalite, as an added zeolite component of a catalyst composition for FCC, has been found advantageous in targeting propylene yield while unexpectedly overcoming capacity constraints associated with high dry gas and coke yields, as discussed above and observed for other zeolite catalyst compositions. Without being bound by theory, it is believed that the siliceous zeolite component provides the beneficial suppression of free radical formation without adversely impacting shape-selective zeolite cracking reactions that yield desired olefins and particularly propylene.

Embodiments of the invention are therefore directed to FCC processes comprising contacting, in an FCC reaction zone, a heavy hydrocarbon stream with a cracking catalyst composition comprising a large pore zeolite, a medium pore zeolite, and a third, siliceous zeolite (i.e., different from both the large and medium pore zeolites) having a silica to alumina framework molar ratio of at least about 100, with silicalite being representative. Catalytic cracking reactions provide an effluent stream comprising $C_1$-$C_4$ hydrocarbons (e.g., light olefins such as propylene) and gasoline boiling range hydrocarbons. Reduced yields of both dry gas and coke decrease both the overall downstream gas handling and catalyst regeneration gas requirements, thereby increasing the overall flow rate of a heavy hydrocarbon stream that can be processed with a given FCC unit. It will be appreciated that even incremental capacity improvements can provide, on a commercial scale, significant economic benefits to a refiner.

Other embodiments of the invention are directed to catalyst blends comprising separate catalyst particles of (i) Y zeolite, (ii) ZSM-5 zeolite, and (iii) silicalite having a silica to alumina framework molar ratio from about 200 to about 1000. Separate catalyst particles of silicalite contain this zeolite in an amount from about 20% to about 75% by weight. Silicalite is present in the overall catalyst composition (e.g., catalyst blend) in a representative amount from about 1% to about 10% by weight.

According to particular embodiments of the invention, the silicalite, as a component of the catalyst composition (or catalyst blend), can be characterized as "nano-silicalite," having an average crystallite size of less than about 500 nanometers (nm), and typically less than about 300 nm.

These and other aspects and embodiments associated with the present invention are apparent from the following Detailed Description.

DETAILED DESCRIPTION

The present invention is associated with fluid catalytic cracking (FCC) processes for the production of propylene and other reduced molecular weight hydrocarbons from heavy hydrocarbon feed streams comprising high boiling hydrocarbon fractions such as gas oils or residues obtained from the vacuum column distillation, often referred to simply as vacuum gas oil (VGO) or vacuum resids. Catalyst compositions found to provide a number of advantages in these processes, as discussed above, comprise three different zeolites, namely a large pore zeolite, a medium pore zeolite, and a zeolite having a silica to alumina framework molar ratio of at least about 100. The three different zeolites, or any two of the three zeolites, may or may not be dispersed in the same binder or matrix. Regardless of whether they are incorporated on the same or different matrices, the three components are circulated throughout the entire FCC reaction and regeneration zones in a conventional, fluidized manner.

As discussed above, it has been determined that the addition of the third zeolite, namely a siliceous zeolite having a very high silica to alumina framework molar ratio ($SiO_2$: $Al_2O_3$ ratio), beneficially reduces non-selective dry gas as well as coke yields compared to catalyst compositions lacking this zeolite component and used in FCC processes targeting propylene production. Suitable siliceous zeolites, for example, have a silica to alumina framework molar ratio of at least about 100. This corresponds to an atomic silicon to aluminum framework ratio (Si:Al ratio), or of at least about 50. The Si:Al ratio is also frequently used in characterizing zeolites or other crystalline aluminosilicates and is half of the molar $SiO_2$:$Al_2O_3$ ratio. In other embodiments, the siliceous zeolite has a silica to alumina molar framework ratio of at least about 200, and typically this quantity is in the range from about 500 to about 2000, often from about 600 to about 1000.

The siliceous zeolite can have any of a number of crystalline structure types. Representative structures having 10-membered ring pores include MFI, MEL, NES, SFG, MWW, and ITH structures that are described in Meier, W. M, et al., ATLAS OF ZEOLITE STRUCTURE TYPES, 4$^{th}$ Ed., Elsevier: Boston. A preferred zeolite is silicalite, having the MFI structure type. Other specific examples of siliceous zeolites include NU-87 and SSZ-37, having the NES structure type; SSZ-58, having the SFG structure type; MCM-22 and UZM-8, having the MWW structure type; and ITQ-13 having the ITH structure type.

The siliceous zeolite is normally synthesized as zeolite crystallites that may be bound into larger catalyst particles using a suitable binder or matrix. Crystallites refer to individual crystals of the synthesized material as opposed to agglomerated crystals or agglomerated zeolite particles. The average crystallite size may be determined from Scanning Electron Microscopy (SEM) analysis of the siliceous zeolite crystallites. According to some embodiments of the invention, a nano-sized siliceous zeolite is used, having a representative average crystallite size of less than about 500 nanometers (nm), and possibly less than 300 nm, for example in the range from about 50 nm to about 300 nm.

If a binder is used for the siliceous zeolite, it preferably contains only minor amount of alumina (e.g., less than about 20%, less than about 5%, or less than about 1% by weight) or no alumina, or, in other cases, contains alumina that is inactivated or neutralized at least on the surface of the bound catalyst particles to limit their cracking activity. A preferred binder is silica. The binder is typically present in the bound catalyst particles comprising the siliceous zeolite in an amount from about 10% to about 50% by weight, and of from about 15% to about 40% by weight. In many cases it is desired to also include a filler, since replacing some of the binder material with filler can substantially lower catalyst cost without a commensurate loss in performance. A preferred filler is kaolin, but clays and other minerals (e.g., containing silica) may also be used. In the case of bound catalyst particles comprising the siliceous zeolite, the zeolite is typically present in the catalyst particles an amount from about 20% to about 75% by weight, and often from about 30% to about 60% by weight, with the balance of this weight normally being the binder and optional filler(s). Also, the bound catalyst particles are generally present in an amount, relative to the overall catalyst composition, from about 2% to about 20% by weight, and often from about 3% to about 10% by weight. An exemplary, bound siliceous zeolite catalyst comprises from about 30% to about 50% silicalite that is bound with a silica binder.

Whether or not the siliceous zeolite is bound with a binder or matrix as described above, or is included together on a common matrix of another zeolite of the catalyst composition as described below, the zeolite itself is typically present in the catalyst composition (e.g., a blend of catalyst particles of each of the three zeolite components in separately bound forms) in an amount from about 0.1% to about 10% by weight, normally from about 1% to about 8% by weight, and often from about 1% to about 5% by weight.

In addition to the siliceous zeolite component, other components of the catalyst composition are different, large pore and medium pore zeolites. The large pore zeolite component of the catalyst composition typically has pores with an effective pore diameter of greater than 0.7 nanometers (nm) that are defined by 10- or more-membered rings, typically 12-membered rings. Pore Size Indices of large pores are above about 31. Suitable large pore zeolites include synthetic zeolites such as zeolite X, zeolite Y, mordenite and faujasite.

An exemplary large pore zeolite is zeolite Y. The structure of zeolite Y is described, and further references are provided, in ATLAS OF ZEOLITE STRUCTURE TYPES, cited above, as well as U.S. Pat. No. 4,940,830 and U.S. Pat. No. 3,130,007. The composition and structure of zeolite Y is additionally discussed in Breck, D. W., ZEOLITE MOLECULAR SIEVES:STRUCTURE, CHEMISTRY, AND USE; John Wiley & Sons: New York, pp. 93, 97, and 177 (1974). The framework silica: alumina molar ratio of the zeolite Y is typically between about 4.0:1 and about 6.5:1 and often less than about 5.5:1. Zeolite Y or other large pore zeolites are normally present in the catalyst composition in the form of bound catalyst particles. A representative binder or matrix for the large pore zeolite is silica, alumina, or a mixture thereof, which may also be combined with a filler such as kaolin or similar materials. A particular type of zeolite Y has a low rare earth content, meaning that the total rare earth oxide content of the zeolite is 1.0% by weight or less. Octacat™ catalyst (W.R. Grace & Co., Columbia, Md., USA) is an example of a catalyst comprising a low rare earth zeolite Y.

The medium pore zeolite component of the catalyst composition typically has pores with an effective pore diameter of less than or equal to 0.7 nm that are defined by 10- or fewer-membered ring pores. Pore Size Indices of medium pores are generally less than 31. Representative medium pore zeolites include ZSM-5, ZSM-11, ZSM-12, ZSM-23, ZSM-35, ZSM-38, ZSM-48, and other similar materials. An exemplary medium pore zeolite is ZSM-5, which is described in detail in U.S. Pat. No. 3,702,886. Other suitable medium pore zeolites include ferrierite, erionite, and ST-5, developed by Petroleos de Venezuela, S.A. Like the siliceous zeolite and large pore zeolite, the medium pore zeolite is also preferably bound into catalyst particles using a matrix comprising a binder material such as silica, alumina, or mixtures thereof, and optionally a filler material such as kaolin. In catalysts comprising the medium pore zeolite, the zeolite is normally present in an amount from about 10% to about 50% by weight, with the balance typically being the binder and optional filler. Such catalysts may further comprise an additional active material such as zeolite Beta. An exemplary medium pore zeolite catalyst comprises ZSM-5 zeolite in an amount from about 20% to about 40% by weight. Catalysts with greater crystalline zeolite content may be used, provided they have satisfactory attrition resistance for a given service such as FCC.

The total catalyst composition, comprising the three zeolite components which may, for example, be present as separate bound catalysts, normally should contain from about 1% to 50% by weight of the medium pore zeolite, with a range from about 4% to about 40% being preferred. According to exemplary embodiments, the medium pore zeolite is ZSM-5, ST-5, or a mixture thereof, with the total medium pore zeolite being present in the total catalyst composition in an amount from about 1% to about 10% by weight, and often from about 1% to about 5% by weight.

Particular embodiments of the invention are therefore directed to catalyst compositions that are blends comprising separate catalyst particles of (i) Y zeolite, (ii) ZSM-5 zeolite, and (iii) silicalite having a silica to alumina framework molar ratio from about 100 to about 500. The separate catalyst particles of silicalite contain from about 20% to about 75% by weight of silicalite and the silicalite zeolite component is present in the catalyst blend in an amount from about 1% to about 10% by weight.

As stated above, the large pore zeolite (e.g., Y zeolite), the medium pore zeolite (e.g., ZSM-5 zeolite), and the siliceous zeolite (e.g., silicalite zeolite) components may otherwise be dispersed in a single binder or matrix material. Alternatively, a catalyst blend may comprise two separate types of catalyst particles, with one type of catalyst particle comprising two of the zeolite components in bound form and a second type of catalyst particle comprising the third zeolite component, either in bound or unbound form. Various other ways of obtaining the catalyst compositions described herein will be readily appreciated by those skilled in the art and having knowledge of the present specification. Catalyst compositions in the form of blends of separate catalysts may be prepared and sold by a catalyst manufacturer or prepared on-site by the refiner, for example by mixing a catalyst comprising the siliceous zeolite with other catalysts in a desired ratio. Blends may also be prepared in situ, for example, by adding a zeolite component such as silicalite in bound form, to an FCC catalytic cracking zone in operation.

Processes according to embodiments of the invention include contacting the heavy hydrocarbon stream and a catalyst composition comprising three zeolite components as described above, in a fluid catalytic cracking zone to crack the larger heavy hydrocarbon molecules to smaller hydrocarbon molecules, including olefins such as propylene, while limiting the amount of dry gas and coke formed. The cracking of the heavy hydrocarbon stream involves a complex set of reactions to generate the lighter hydrocarbon molecules. As discussed above, the catalyst compositions described herein allow greater control over the selection of products and a reduction in undesirable products such as dry gas (hydrogen, ethane, ethylene, and methane) and coke. Low coking reduces the regeneration temperature requirements for burning accumulated coke from the catalyst. The catalyst compositions described herein having three or more zeolite components allow refiners to target propylene yield while avoiding the significant capacity constraints associated with increased high dry gas and coke yields observed with other FCC catalyst compositions.

Heavy hydrocarbon streams that may be subjected to FCC may comprise high boiling fractions of crude oil, including atmospheric and vacuum gas oil (VGO) (e.g., light vacuum gas oil (LVGO) and heavy vacuum gas oil (HVGO)) recovered from crude oil fractionation. Other heavy hydrocarbon streams, or components thereof, include residual oils such as crude oil atmospheric distillation column residues (e.g., boiling above about 343° C. (650° F.)), crude oil vacuum distillation column residues (e.g., boiling above 566° C. (1050° F.)), tars, bitumen, coal oils, shale oils, and Fischer-Tropsch wax. Whole or topped petroleum crude oils such as heavy crude oils may also be used as all or a part of a heavy hydrocarbon stream, as well as other straight run and processed hydrocarbon streams that can benefit from a reduction in molecular weight to produce more valuable cracked products (e.g., gasoline boiling range hydrocarbons). Other refractory hydrocarbon streams containing predominantly hydrocarbons boiling in the range from about 343° C. (650° F.) to about 593° C. (1100° F.) may be used. Heavy hydrocarbon streams may comprise combinations of any two or more of the above streams, used in a combined feed stream. Heavy hydrocarbon streams will generally contain a substantial amount, for example at least about 60%, typically at least about 90%, and often at least about 95% by volume, of hydrocarbons boiling at greater than a representative cutoff temperature for a crude oil atmospheric column residue, for example 343° C. (650° F.).

A FCC reactor system which may be employed according to embodiments of the invention is described in U.S. Pat. No. 6,183,699. In a representative FCC process, the heavy hydrocarbon stream contacts the catalyst composition comprising three zeolite components as described above, normally as a regenerated FCC catalyst composition exiting a regenerator or regeneration zone. The catalyst composition is fluidized, with the fluidized reaction mixture normally flowing upwardly through a catalytic cracking or reaction zone. To obtain the proper flow conditions for fluidization, an additional diluent gas can be added. Suitable diluent gases include non-oxidative gases that are relatively inert in the FCC process, such as nitrogen, argon, carbon dioxide, steam, methane, and mixtures of these gases. Adding a diluent such as steam or other inert gas lowers the partial pressure of the reactant hydrocarbons, while generally maintaining the operating temperature and pressure of the system.

In the catalytic cracking zone, a typical weight ratio of regenerated catalyst composition to heavy hydrocarbon feed (or "catalyst to oil ratio") at the inlet of the catalytic cracking zone is from about 2 to about 50, and is often from about 3 to about 25. A typical catalytic cracking zone is a riser reactor, in which catalyst and hydrocarbons are contacted in the proper ratio and under proper conditions of temperature, pressure, and residence time to achieve a desired conversion level for a given feed. In general, therefore, high boiling hydrocarbons in the heavy hydrocarbon stream, as a feedstock, are converted in the catalytic cracking zone to lower boiling hydrocarbons. Representative conditions in the catalytic cracking zone include a temperature from about 450° C. (842° F.) to about 700° C. (1292° F.), often from about 500° C. (932° F.) to about 565° C. (1050° F.), and a pressure from about 0.07 barg (1 psig) to about 3.4 barg (50 psig), often from about 0.7 barg (10 psig) to about 2.1 barg (30 psig).

The severity of conditions in the catalytic cracking zone can be varied to obtain a desirable slate of products, which normally includes $C_1$-$C_4$ hydrocarbons and gasoline boiling range hydrocarbons. Gasoline boiling range hydrocarbons can include, for example, $C_5$ hydrocarbons having a distillation temperature of 380° F. (193° C.) at the 90% recovery point. Reaction zone severity can be increased or decreased to provide, respectively, mostly distillate boiling range hydrocarbons, or mostly $C_4^-$ hydrocarbons, and particularly valuable olefinic hydrocarbons such as propylene. Regardless of the operating severity, the product hydrocarbons in the effluent stream, having a reduced boiling point, are separated in a product recovery section, normally including an FCC main column, optionally in combination with additional distillation columns and/or flash separators providing one or multiple stages of vapor-liquid contacting to separate products on the basis of differences in relative volatility.

For example, the main column can separate gasoline boiling range hydrocarbons from the reactor effluent as an FCC gasoline product stream along with other products. The FCC gasoline product may be debutanized, such that it contains, for example, less than about 3%, and often less than about 1%, by volume of $C_4$ and lighter hydrocarbons. A $C_4^-$ hydrocarbon stream can therefore be separately recovered from the reactor effluent, with this stream typically being further fractionated into fuel gas and more valuable $C_3$/$C_4$ hydrocarbons. Further product streams may include one or more products containing higher boiling hydrocarbons, compared to those in an FCC gasoline product stream. Examples of such product streams are heavy naphtha and light cycle oil products. According to some embodiments, unconverted hydrocarbons exiting the main column, for example in the bottoms stream, may be recycled to the catalytic cracking zone to enhance the overall conversion.

Representative FCC processes are operated with a dynamic heat balance, whereby heat is supplied to catalytic cracking zone by the hot, regenerated catalyst composition. An integral part of the FCC process therefore involves separating and removing spent or coked catalyst composition from the catalytic cracking zone after reaction to combust deposited coke in an FCC regenerator or regeneration zone. Both (i) the coke formed in the fluidized reaction mixture as a byproduct of the desired catalytic cracking reactions, and (ii) metal contaminants in the heavy hydrocarbon feed stream, serve to deactivate the FCC catalyst composition by blocking its active sites. Coke must therefore be removed to a desired degree by regeneration, which involves contacting the catalyst composition in its spent or coked form with a regeneration gas stream containing oxygen, typically air or nitrogen-enriched air having a reduced oxygen content. The combustion of accumulated coke on the spent catalyst composition provides a regenerated catalyst composition, typically having a level of deposited coke of less than about 3%, and often less than about 1% by weight.

Catalytic cracking processes utilizing the catalyst compositions can also be carried out in a continuous mode in a fixed bed reactor or in a fixed fluidized bed reactor, or even a batch reactor, rather than a circulating fluidized bed reactor as described above and characteristic of commercial FCC processes. In a fixed bed reactor, the weight hourly space velocity (WHSV) based on the total feed (heavy hydrocarbons and any diluents), can vary from about 2 $hr^{-1}$ to about 200 $hr^{-1}$ and preferably from about 10 $hr^{-1}$ to about 100 $hr^{-1}$. As is understood in the art, the WHSV is the weight flow of the feed divided by the weight of the catalyst bed and represents the equivalent catalyst bed weights of feed processed every hour. The WHSV is related to the inverse of the reactor residence time.

Those having skill in the art, with the knowledge gained from the present disclosure, will recognize that various changes can be made in the above catalyst compositions and associated processes without departing from the scope of the present disclosure. Mechanisms used to explain theoretical or observed phenomena or results, shall be interpreted as illustrative only and not limiting in any way the scope of the appended claims.

The following examples are set forth as representative of the present invention. These examples are not to be construed as limiting the scope of the invention as other equivalent embodiments will be apparent in view of the present disclosure and appended claims.

EXAMPLE 1

Silicalite Preparations

Nano silicalite, having an average crystallite size in the ranges described above, can be formed by hydrothermal crystallization followed by $NH_4^+$ ion-exchange and calcination steps to remove $Na^+$ ions and the structure directing agent. The product is characterized by x-ray diffraction (XRD) at each step of the preparation, and the final product characterized further by elemental analysis using inductively coupled plasma (ICP) atomic emission, $N_2$ sorption, and scanning electron microscopy (SEM) to confirm the crystallite size and distribution. An exemplary synthesis procedure is described in U.S. Pat. No. 7,459,596.

In another exemplary procedure according to these general methods, silicalite having an average crystallite size in the range of 150-400 nm was synthesized. A gel composition was first prepared, having the following molar component ratios: 5 $Na_2O$ :25 $SiO_2$:250 $H_2O$:0.5 tetrapropylammonium hydroxide (TPAOH). To prepare the gel, 478 grams of deionized (DI) water and 126 grams of ULTRASIL® (Evonik Degussa GmbH) as a silica source were added under mixing over a 5-minute period. After 10 minutes subsequent to this mixing period, 740 grams of sodium silicalite were added over a 2-minute period. Finally, 55 grams of 40% TPAOH were added. The gel homogenized for 1 hour and was transferred to two 2-liter TEFLON bottles and digested for 96 hrs at 98° C. (208° F.). After calcination at 600° C. (1112° F.), XRD confirmed the silicalite structure and its purity. The silicalite had a silica to alumina framework molar ratio of 1006 (i.e., 503 Si:Al atomic ratio), a surface area of 308 m$^2$/gram (BET), a pore volume of 0.24 cc/gram, and a micropore volume of 0.152 cc/gram.

The prepared silicalite was suspended in a solution of DI water containing the phosphorous compound, ammonium phosphate monobasic (NH$_4$H$_2$PO$_4$), at a liquid to solid ratio of 10 wt/wt. The phosphorous level was targeted at 1%. The suspension was rotoevaporated until dry for about 1 hour, followed by oven drying for 2 hours at 100° C. (212° F.), and then calcining at 550° C. (1022° F.) for 1 hour. The resulting sample was then extruded with silica, dried, and calcined at 550° C. (1022° F.) for 4 hrs. The extruded sample was sized to 120-200 mesh size as a catalyst sample.

EXAMPLE 2

Comparative Testing of Catalyst Blends

A commercial FCC catalyst composition containing a blend of two types of catalyst particles, namely one type containing zeolite Y and another type containing ZSM-5 zeolite, was used as a reference catalyst composition. This composition had a total content of the ZSM-5 zeolite component of about 6-8% by weight. A second catalyst composition was prepared by adding 5% by weight (based on the total composition) of catalyst particles containing 40% by weight of nano-silicalite zeolite having a silica to alumina framework molar ratio of 740 (i.e., 370 Si:Al atomic ratio).

The reference catalyst composition and composition containing the additional siliceous zeolite component were tested in a pilot plant for product yields obtained from cracking a commercial refinery VGO sample. Conversion to gasoline and lighter hydrocarbons (i.e., hydrocarbons boiling below 218° C. (425° F.)) was varied during the testing of each catalyst composition by varying the catalyst to oil ratio. Product yields at range of conversions bracketing 75% by weight were obtained, in order to estimate the yields at 75% by weight conversion. These estimated yields are summarized below in Table 1.

TABLE 1

Product yields, % by weight

| Yield, wt-% based on feed | Reference Catalyst Composition | Reference Catalyst Composition with Silicalite Additive |
|---|---|---|
| Coke | 3.90 | 3.30 |
| Hydrogen | 0.20 | 0.15 |
| Methane | 0.93 | 0.78 |
| Ethane | 0.58 | 0.48 |
| Ethylene | 1.93 | 1.92 |
| Propylene | 13.2 | 13.2 |
| Propane | 1.92 | 1.66 |
| Butanes | 17.7 | 17.1 |
| Gasoline | 34.6 | 36.4 |

In view of the above results, the use of the siliceous zeolite additive reduced catalyst coke formation by 15% and total dry gas (hydrogen, methane, ethane, and ethylene) yield by 8.5%. Gasoline yield was increased and no loss of propylene yield was observed. Moreover, at one of the catalyst to oil ratio test conditions, namely 5/1 catalyst/oil, the same conversion level of 72.1% by weight was obtained for both catalyst compositions. Surprisingly, the addition of 5% by weight of the silicalite catalyst particles to the catalyst blend therefore did not affect the overall catalyst activity, in view of the fact that the two catalyst compositions were tested under the same operating conditions. This was despite the dilution of the active zeolite Y component by the additive.

EXAMPLE 3

Additional Comparative Testing of Catalyst Blends

Comparative FCC pilot plant testing was performed using the commercial reference catalyst composition and the composition containing the additional siliceous zeolite component, as described in Example 2. In this pilot plant testing work, a different commercial refinery VGO sample was used as FCC feed. Otherwise, operating conditions and other variables were comparable to those in Example 2. Again, product yields at 75% by weight conversion were interpolated, using yield data obtained at conversions bracketing this conversion level. In view of the results of this test, compared to reference catalyst, the use of the siliceous zeolite additive reduced total dry gas yield by 6.5% and increased gasoline yield by 2.0%. The coke yield was comparable and the yield of propylene decreased by 3.5%. Again, the addition of the siliceous zeolite component did not significantly impact catalyst activity.

Economic Impact based on Yield Estimates

The relative changes in product yields, as described in Examples 2 and 3, were obtained in two additional testing examples, namely (1) processing a third FCC feed over a different base FCC catalyst composition than that used in Examples 2 and 3, both with without the added siliceous zeolite component and (2) processing a fourth FCC feed over yet another, different base FCC catalyst composition, both with without the added siliceous zeolite component. By averaging the relative yield changes for the catalyst in all four testing examples, a commercial FCC process yield estimate was generated based on a computer algorithm. In the case of a 50,000 barrel per day FCC unit, it was estimated that the use of the siliceous zeolite additive would improve feed processing capacity or throughput by 6%, due to the reduced dry gas yield, at the same constraint levels for gas handling and catalyst regeneration. Assuming an overall cost of the additive of $13,000 per ton, as well as current feed and product values, the yield advantages exhibited by the use of the additive to the catalyst composition would be expected to increase FCC operating profit by $35 million per year.

The invention claimed is:
1. A catalyst blend comprising separate catalyst particles of (i) Y zeolite, (ii) ZSM-5 zeolite, and (iii) silicalite having a silica to alumina framework molar ratio from about 500 to about 2000, wherein (a) said separate catalyst particles of silicalite contain from about 20% to about 75% by weight of silicalite and (b) said silicalite is present in said catalyst blend in an amount from about 1% to about 10% by weight.
2. The catalyst blend of claim 1, wherein said silicalite has an average crystallite size of less than about 100 nanometers.

* * * * *